United States Patent [19]

Jadamus et al.

[11] Patent Number: 4,647,613

[45] Date of Patent: Mar. 3, 1987

[54] THERMOPLASTIC COMPOSITIONS BASED ON POLYPHENYLENE ETHERS, STYRENE POLYMERS, AND POLYOCTENYLENES, AND METHODS OF MANUFACTURING SAME

[75] Inventors: Hans Jadamus, Marl; Wilfried Ribbing, Dorsten; Roland Feinauer; Wolfgang Schaefer, both of Marl, all of Fed. Rep. of Germany

[73] Assignee: Chemische Werke Huls Aktiengesellschaft, Marl, Fed. Rep. of Germany

[21] Appl. No.: 792,540

[22] Filed: Oct. 29, 1985

[30] Foreign Application Priority Data

Nov. 20, 1984 [DE] Fed. Rep. of Germany ....... 3442273

[51] Int. Cl.$^4$ .................... C08L 51/00; C08L 71/04
[52] U.S. Cl. .................... 524/504; 523/309; 523/335; 523/340; 524/501; 524/505; 525/68; 525/92; 525/132; 525/152; 525/905
[58] Field of Search .................. 525/68, 92, 905, 132, 525/152; 523/309, 335, 340; 524/501, 504, 505

[56] References Cited

U.S. PATENT DOCUMENTS

| | | | |
|---|---|---|---|
| 3,660,531 | 5/1972 | Lauchlan | 525/905 |
| 4,164,493 | 8/1979 | Cooper et al. | 525/132 |
| 4,480,057 | 10/1984 | Sano | 525/92 |

*Primary Examiner*—Jacob Ziegler
*Attorney, Agent, or Firm*—Oblon, Fisher, Spivak, McClelland & Maier

[57] ABSTRACT

Thermoplastic compositions comprised of the following components:
 (A) Polyphenylene ether, in the amount of 20-90 parts by weight;
 (B) Styrene resins, in the amount of 5-70 parts by weight;
 (C) Polyoctenylenes, in the amount of 2-20 parts by weight;
 (D) Copolymers based on styrene and butadiene, in the amount of 0-20 parts by weight; and
 (E) Optionally, other additives;
are disclosed.

24 Claims, No Drawings

THERMOPLASTIC COMPOSITIONS BASED ON POLYPHENYLENE ETHERS, STYRENE POLYMERS, AND POLYOCTENYLENES, AND METHODS OF MANUFACTURING SAME

BACKGROUND OF THE INVENTION

1. Field of the Invention

This invention relates to thermoplastic compositions based on polyphenylene ethers, styrene polymers and polyoctenylenes, and methods of manufacturing these.

2. Description of the Prior Art

Polyphenylene ethers, also called polyphenylene oxides, are polymers with good thermal and electrical properties. Poly(2,6-dimethyl-1,4-phenylene ether) ("PPE"), in particular, has become industrially important as a component in thermoplastic molding compositions. Because of their high viscosity when molten, pure polyphenylene ethers are difficult to process. Molded pieces produced from pure polyphenylene ethers have high Vicat softening temperature low impact strength, particularly in the neighborhood of external notches.

Many means have been proposed for improving the processibility and impact strength of molded pieces from polyphenylene ethers; see German Patent No. 1,694,255 (corresponding to U.S. Pat. No. 3,361,851), German Patent No. 1,694,257 (corresponding to U.S. Pat. No. 3,383,435), and German Patent No. 1,694,290 (corresponding to U.S. Pat. No. 3,379,792). However, it has turned out that the addition of polyolefins, polystyrenes, and/or polyamides still does not yield PPE-containing compositions possessing optimal properties.

Mixtures of polyphenylene ethers with high impact polystyrenes ("HIPS") have become very important industrially (see German Patent No. 2,211,005). The thermoplastic compositions claimed in German Patent No. 2,119,301 are comprised of polyphenylene ethers plus a rubber-modified polystyrene and/or a polystyrene and a rubber. High impact strength is claimed for compositions in which the mean particle diameter of the dispersed elastomeric phase is less than circa 2 micron.

In principle, a wide variety of mixtures can be formulated from polyphenylene ethers and HIPS containing various amounts of rubbers. However, this approach is costly, because one must have available numerous different types of polystyrene in order to be able to adjust the properties of the composition as required in various application situations.

It would be simpler and easier if one could vary the properties of products comprising thermoplastic compositions by simply varying the proportions of the components when compounding mixtures comprised of: polyphenylene ethers, a single commercially available type of polystyrene, and additives to improve impact strength.

While it is possible to work rubbers into a mixture of polyphenylene ethers and styrene polymers after producing the mixture, one must contend with the fact that the form in which rubbers are ordinarily available is the ball form, and thus they are difficult to handle. Accordingly, the after-mixing technique is fraught with formidable technical difficulties.

Abandoned European OS No. 0,016,829 discloses that in addition to rubbers prepared by polymerization of butadiene and having the general formula

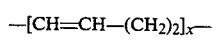

there are available polyalkenylenes with the general structure

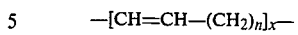

which can be obtained by ring-opening polymerization of cycloolefins. Here n is thus the number of ring carbon atoms minus 2. Polypentenylenes are of particular interest, because molding compositions comprised of polyphenylene ethers and polypentenylene, or comprised of polyphenylene ethers and a styrene resin which has been modified with polypentenylene would be expected to provide improved impact strength. However, apart from the fact that polypentenylene is no longer commercially available, incorporating it into a mixture based on a polyphenylene ether involves the same difficulties as does mixing-in ordinary rubbers. German OS No. 31 38 401 discloses molding compositions comprised of a polyphenylene ether and an impact-resistant modified styrene polymer, and states that molding compositions prepared according to European OS No. 0,016,829 do not have good weatherability or good impact strength. The soft component of the styrene polymer disclosed by German OS No. 31 38 401 is a polyoctenylene with a glass transition temperature below −40° C. However, with such mixtures one does not achieve compositions with improved impact strength in comparison to compositions employing customarily used rubbers as the softening components.

Neither compositions based on polyphenylene ethers and polypentenylenes, nor compositions based on polyphenylene ethers and an impact-resistant modified styrene polymer with polyoctenylene as the softening component appear to provide any recognizable advantages compared with compositions with conventional rubber. It therefore hardly seems likely that polyphenylene ether mixtures which include polyoctenylenes would be candidates for fulfilling the current demanding requirements for high impact molding compositions.

Accordingly, there is ample room for improvement in the area of thermoplastic compositions based on polyphenylene ethers. Both thermoplastic compositions based on polyphenylene ethers possessing good desirable characteristics, such as Vicat sofening temperature and high impact strength, as well as more facile methods for preparing these and being able to modify the properties as desired, are strongly felt in this art. Thus there is a notable need for polyphenylene ether based compositions characterized with high impact resistance as well as high Vicat softening temperature. There is likewise a strongly felt need for better methods of manufacturing polyphenylene ether based thermoplastic compositions where any of a variety of desired properties can be easily adjusted and modified during the manufacturing process.

SUMMARY OF THE INVENTION

The underlying characteristic of the present invention is to devise polymer mixtures based on polyphenylene ethers, which mixtures have superior impact resistance, and wherewith a high degree of freedom is afforded in adjusting the prescribed properties (such as shape stability under heating, impact resistance, and processibility) by varying the amounts of the components of said mixtures.

Accordingly it is an object of this invention to provide a novel thermoplastic composition based on polyphenylene ethers, where this thermoplastic composition is characterized by having a high Vicat coftening temperature.

Accordingly, it is another object of this invention to provide a novel thermoplastic composition based on polyphenylene ethers, where this thermoplastic composition is characterized by a high impact strength.

It is another object of this invention to provide a novel polyphenylene based thermoplastic composition which is characterized by high impact strength, particularly in the neighborhood of notches.

It is another object of this invention to provide a novel polyphenylene ether based thermoplastic composition in which there is a high degree of freedom in adjusting prescribed properties of this thermoplastic composition.

It is another object of this invention to provide novel polyphenylene ether based thermoplastic compositions in which the hot shape stability may be easily adjusted by varying the amounts of the components of the composition.

It is another object of this invention to provide a novel polyphenylene ether based thermoplastic composition which is characterized by the fact that its impact resistance characteristic may be easily adjusted by varying the amounts of components in the composition.

It is another object of this invention to provide a novel method for manufacturing the polyphenylene ether based thermoplastic composition of this invention.

It has now surprisingly been found that all of the objects of this invention are fully met by a thermoplastic composition comprised of a mixture of the components outlined below.

(A) Polyphenylene ether, in an amount of 20-90 parts by weight;

(B) Styrene polymers, in an amount of 5-70 parts by weight;

(C) Polyoctenylenes, in an amount of 2-20 parts by weight;

(D) Copolymers based on styrene and butadiene, in an amount of 0-20 parts by weight; and (E) Optionally, other additives.

These thermoplastic compositions are distinguished by high impact resistance, high Vicat sofening temperature and good processability.

DETAILED DESCRIPTION OF THE PREFERRED EMBODIMENTS

The present invention thus relates to a novel thermoplastic composition based on a polyphenylene ether, a styrene resin and a polyalkenylene. This composition is characterized by containing the following components in the quantities below:

(A) a polyphenylene ether in an amount of 20-90 parts by weight;

(B) a styrene resin, in an amount of 5-70 parts by weight;

(C) a polyoctenylene in an amount of 2-20 parts by weight; and (D) a copolymer based on styrene and butadiene, in an amount of 0-20 parts by weight.

This thermoplastic composition may optionally also contain other additives, E.

In a preferred embodiment of this invention, the polyphenylene ether component, A, is a polymer of 2,6-dimethylphenol.

In another preferred embodiment of this invention, the polyphenylene ether component, A, has a viscosity number (according to DIN 53 728) of 40-65 ml/g.

In another preferred embodiment of this invention, the styrene resin, B, is a styrene homopolymer with a molecular weight between 150,000 and 300,000.

In another preferred embodiment of this invention, the styrene resin, B, is a high impact polystyrene.

In another preferred embodiment of this invention, the polyoctenylene, C, has a viscosity number (according to DIN 53 728) of 50-350 ml/g, and 55-95% of the double bonds in this polyoctenylene are in the trans configuration.

In another preferred embodiment of this invention, the copolymer based on styrene and butadiene, D, is a styrene-butadiene copolymer with a styrene content of 15-40 wt.%.

In another preferred embodiment of this invention, the copolymer based on styrene and butadiene, D, is a S-B-S block copolymer of styrene and butadiene.

In another preferred embodiment of this invention, the other additive which may optionally be added, E, is a reinforcing and filling material which may be used in a quality of up to 50 wt.%, a flame retardant which may be used in an amount of 15 wt.%, such that the total amount of all of these additives is up to 5 wt.% based on the total weight of the entire molding composition.

In another preferred embodiment of this invention, the amounts of components A, B, C, and D satisfy the following condition:

$$5 < [(a+b)/(c+d)] < 15,$$

where a, b, c, and d represent the parts by weight of components A, B, C, and D, respectively.

In another preferred embodiment of this invention, the following conditions apply:

$$0.5 < (a/b) < 2, \ 0.5 < (c/d) < 2, \text{ and } d > 0.$$

In another preferred embodiment of the present invention, the thermoplastic composition is prepared by a process which is characterized in that the components, and optionally any other additives, are melted and mixed together.

In another preferred embodiment of this invention, in the method of manufacturing the present novel thermoplastic composition a melting temperature of 230°-320° C., preferably 240°-300° C. is used.

In another preferred embodiment of this invention, in the method of manufacturing the present thermoplastic composition, the components are dissolved in a suitable solvent, and the thermoplastic composition is isolated by evaporation of the solvent or by precipitation of the thermoplastic composition from the solvent with a desolubilizing agent.

In another preferred embodiment of this invention, only part of the components are dissolved in a solvent and isolated by either evaporation of the solvent or precipitation out of the solvent with a desolubilizing agent. This resulting preliminary composition is then melted with the rest of the components and intermixed therewith.

As may be seen by comparing Examples 11-17 with the corresponding Comparison Examples (i.e., Examples A to H), impact strength is increased markedly by adding polyoctenylene as a formulating component in the thermoplastic compositions of this invention.

In cases where substantial impact strength of the molding compositions has been obtained by providing a high proportion of copolymers based on styrene and butadiene, the impact strength can be further increased by adding polyoctenylene. Surprisingly, the polyoctenylene in fact has a synergistic effect.

In comparison with the molding compositions described in German Patent Application P No. 34 36 780.2, which are comprised of only polyphenylene ethers, polyoctenylenes, and possibly other additives (not polystyrenes), the inventive compositions have much-improved processability.

In the strictest sense, polyoctenylenes are not rubbers, because they behave as thermoplastics under the relevant conditions of processing (see A. Draexler, 1983, "Kautschuk+Gummi, Kunststoffe" ("Rubbers, Gums, and Plastics"), V. 12, pp. 1037-1043). At room temperature the polyoctenylenes behave a low-melting agents which promote processability, but show no evidence of being candidates for improving impact strength.

Thus it is quite surprising that polyoctenylenes appear to improve the impact strength of polyphenylene ethers when mixtures comprised of polyphenylene ethers, polyoctenylenes, and the other components of the claimed compositions are subjected to certain heat treatment.

The term "thermoplastic compositions" in the context of the present invention should be understood to mean unformed mixtures which can be formed or molded into molded pieces or semifabricated products by thermoplastic processing. The thermoplastic compositions may be produced in the form of, e.g., granulate.

The chief candidates for polyphenylene ether "A" are polyphenylene ethers based on 2,6-dimethylphenol, wherein the ether oxygen of one unit is bound to the benzene nucleus of an adjoining unit. In this way, at least 50 monomer units are linked together to form component A.

In principle, other o,o'-dialkylphenols with preferably up to 6C atoms in each alkyl group are candidates, provided they do not have a tertiary C atom in the alpha-position of the alkyl group. Any of the phenolic monomers may have a methyl group substituent in the 3-position, and possibly also in the 5-position of the benzene nucleus. Obviously, mixtures of the indicated phenols may also be used.

The polyphenylene ethers may be produced from the phenols in the presence of, e.g., complexing agents, such as copper bromide and morpholine (see German OSs Nos. 32 24 692 and 32 24 691). The viscosity numbers (J-values) determined according to DIN 53 728 in chloroform at 25° C. are in the range 35-80 ml/g. The preferred component A is a polymer of 2,6-dimethylphenol, namely poly(2,6-dimethyl-1,4-phenylene ether), with viscosity number 40-65 ml/g.

Ordinarily, the polyphenylene ethers are employed, in the preparation of the inventive thermoplastic compositions, in the form of a powder or pellets.

As component B, styrene homopolymers and/or HIPS may be used.

The styrene homopolymers are prepared from styrene in known fashion, by radical polymerization in suspension or neat (without diluents or suspending agents). Their molecular weights are between 150,000 and 300,000 (see "Kunststoff-Handbuch, Band V, Polystyrol", pub. Carl Hanser Verlag, Munich, 1969; and "Ullmanns Encyklopaedee der technischen Chemie, 4. Auflage, Band 19", pub. Verlag Chemie, Weinheim, 1980).

The HIPS are prepared in known fashion, by polymerizing styrene having dissolved rubbers (e.g. polycis-butadiene), in solution, in aqueous dispersion, or in bulk (withouth diluents or suspending agents). In the so-called mixed process, the styrene with dissolved rubber is prepolymerized neat, and then the polymerizaion is continued in aqueous dispersion to the desired termination point (see, e.g., U.S. Pat. Nos. 2,694,692 and 2,862,906).

The particle sizes of the soft phase are regulated in known fashion in the prepolymerization stage, before the so-called phase reversal. The polymerization may also be carried out in the presence of known chain regulators and/or radical initiators. Details such as, e.g., the relation between the stirring speed and the size and distribution of the rubber particles in the resulting impact resistant polymer are well known to one skilled in the art (see, e.g., Freeguard, B., Brit. Polym. J., 1974, 6, 203-228).

Normally the diameter of the particles in the elastomeric gel phase is <10 micron, preferably <3.5 micron. The mean particle diameter (volumetric mean) is in the range 1-5 micron (disregarding, in this calculation, particles with diameters <0.5 micron or >10 micron).

The volumetric mean particle size is determined by determining (from measurements) and averaging the diameters of equivalent circles (i.e., the "equivalent diameters") of the particles, from thin layer electron micrographs.

Using a distribution plot of the volumes (third power of equivalent diameter) of the particles, the volumetric mean is calculated. At least 2000 particles are used for the determination.

The polyoctenylenes (component "C") are produced by ring-opening and/or ring-expanding polymerizaion of cyclooctene (see, e.g., Draexler, A., 1981, "Kautschuk+Gummi, Kunststoff", 185-190). One can obtain polyoctenylenes with different proportions of cis and trans double bonds, and different J-values (thus different molecular weights) by methods known from the literature. The preferred polyoctenylenes have viscosity number from 50 to 350 ml/g, preferably 80-160 ml/g (determined with a 0.1 wt.% solution in toluene). The double bonds are in the trans form in the amount of 55-95%, preferably 75-85%.

Component D comprises:

Statistical copolymers of styrene and butadiene. These polymers may be produced by, e.g., radical emulsion polymerization. The preferred copolymers have a styrene content of 15-40 wt.%. Obviously, mixtures with other styrene resins may be used; and/or Block copolymers of the type S-B-S, prepared from styrene and butadiene. Such polymers may be produced by, e.g., anionic polymerization in solution (see "Ullmanns Encyklopaedie der technischen Chemie, 4. Auflage, Band 13", 1977, pp, 595 ff., particularly p. 609). The preferred block copolymers have a styrene content of 15-50 wt.%.

Preferably, the components are employed in such a ratio that the following condition applies:

$$5 < [(a+b)/(c+d)] < 15,$$

where a, b, c, and d are the numbers of parts by weight used in the present thermoplastic composition, of the respective components A, B, C, and D.

Particularly preferred compositions are those including at least a small amount of component D, and in which the ratios of the amounts of various components are as follows:

0.5<a/b<2, and 0.5<c/d<2.

Component E of the present thermoplastic compositions may comprise a flame retardant as well as other additives, such as pigments, oligomers, antistatic agents, stabilizers, agents which promote processability, and reinforcing and filling materials, all of which are well known in this art. The reinforcing and filling materials may be present in amounts up to 50 wt.%, the flame retardant in amounts up to 15 wt.%, and all other additives (taken together) in a total amount of up to 5 wt.% (with the wt.% figures based on the weight of the entire molding composition).

Particularly suitable as flame retardants are aromatic phosphorus compounds, such as triphenylphosphene oxide or triphenyl phosphate. Customary halogen-containing fire retardants may also be used. Candidates from this group include halogen-containing organic compounds such as described in, e.g., the monograph Vogel, H., 1966, "Flammenfestmachen von Kunststoff" ("Rendering Plastics Fireproof"), pub. Huethig-Verlag, pp. 94–102. Alternatively, halogenated polymers may be used, e.g. halogenated polyphenylene ethers (see German OS No. 33 34 068) or brominated oligostyrenes or brominated polystyrenes. The halogenated compounds should comprise halogen in the amount of >30 wt.%.

When the flame retardant is a halogenated type, it is recommended that a synergist be employed. Suitable synergists are compounds of antimony, boron, or zinc. These are generally employed in amounts of 5–10 wt.% (based on the overall weight of the thermoplastic compositions).

Suitable reinforcing materials are glass fibers or carbon fibers. A suitable filling material is titanium dioxide.

Suitable stabilizers are: organic phosphites (e.g., didecyl phenyl phosphite or trilauryl phosphite), sterically hindered phenols, tetramethylpiperidine derivatives, benzophenone derivatives, or triazine derivatives.

Suitable agents which promote processability are waxes, e.g. oxidized hydrocarbons or alkali or alkaline earth salts of these.

Other features of the invention will become apparent in the course of the following descriptions of exemplary embodiments which are given for illustration of the invention and are not intended to be limiting thereof.

Important embodiments of the present invention are illustrated in the following three preferred methods by which the molding compositions are produced from polyphenylene ethers and polyoctenylenes.

Method I Melting and Mixing Together the Components

The method is characterized by mixing of the components in the molten state. At least one component is melted, and the melt is then mixed with the remaining components. Alternatively, all the components can be melted together and intermixed.

The preferred melting temperatures are 250°–350° C., particularly 250°–300° C., and the preferred residence times in the molten state are 0.3–10 min, particularly 0.5–3 min.

The usual apparatuses used for handling highly viscous melts are suitable for the melting and mixing. The operation may be batchwise or continuous. Particularly suitable apparatuses are double-screw kneader-mixers, and co-kneaders.

Method II

Preparation of a Common Solution of the Components, and Removal of the Solvent A common solution can be produced by dissolving the components in suitable solvents, which need not be identical, and then combining the solutions. Alternatively, a single solvent may be found in which to dissolve all the components.

Suitable solvents for these purposes are solvents in which the polymers are substantially completely soluble. Candidate solvents include aromatic solvents, preferably toluene.

To separate out the solvent, it is evaporated, for example; or, for example, a desolubilizing agent (e.g., methanol) is added to the solution, whereby the polymer mixture precipitates out, is separated from the mass of the liquid, and is dried.

The concentration of the polymer mixture in the solvent or the solvent mixture is ordinarily between 5 and 70 wt.%, preferably 10–20 wt.%.

Method III

Combination of Methods I and II

In many cases it is advantageous to first prepare a preliminary molding composition according to Method II supra, then melt this composition and combine it with the other components according to Method I.

The additives (component E) may be added to the polymers in Methods I and II, or in a separate operation using ordinary double-screw extruders or co-kneaders.

The inventive thermoplastic molding compositions can be processed into molded pieces via the usual techniques used for thermoplastics, e.g. injection molding or extrusion. Examples of possible areas of industrial application are pipes and tubes, plates, housings, and other articles in the automative, electrical, and precision and specialty manufacturing sectors.

Manufacture and Origin of the Components

1. Polyphenylene ethers:

The polyphenylene ethers are obtained by oxidative coupling of 2,6-dimethylphenol, terminating the reaction when the desired J-value is attained, and then subjecting the mixture to reaction-extraction according to German OSs Nos. 33 13 864 and 33 32 377 (U.S. patent application Ser. No. 582,711, filed Feb. 23, 1984, and Ser. No. 632,125, filed Sept. 18, 1984, respectively).

1.1 A polyphenylene ether with a J-value of 68 ml/g (determined in chloroform according to DIN 53 728) was prepared according to the general preparative method referenced under (1.) supra. The solvent was evaporated off, and the melt was extruded in a degassing extruder, whereafter the strings extruded were granulated.

1.2. Similarly to Example 1.1 supra, a polyphenylene ether with a J-value of 51 ml/g was prepared, extruded, and granulated.

1.3 Similarly to Example 1.1 supra, a polyphenylene ether with a J-value of 48 ml/g was prepared. It was then combined, according to Method II, with a rubber-modified polystyrene in toluene (see Example D).

1.4. Similarly to Example 1.1 supra, a polyphenylene ether with a J-value of 45 ml/g was prepared, and was then combined, according to Method II, with a styrene polymer and a polyoctenylene, in toluene (see Examples 13 and 14).

1.5. A polyphenylene ether with a J-value of 50 ml/g was prepared by oxidative coupling of 2,6-dimethylphenol, terminating the reaction, and then subjecting the mixture to reaction-extraction according to German OSs Nos. 33 13 864 and 33 32 377 (see supra). A mixture of this polyphenylene ether and rubber-modified polystyrene according to Example 2.2, in a weight ratio of 55:45, was prepared according to the method of German Patent Application P No. 33 37 629 (U.S. patent application Ser. No. 657,247, filed Mar. 10, 1984).

1.6. Similarly to Example 1.1, a 10 wt.% organic solution of a polyphenylene ether, said polyphenylene ether having a J-value of 56 ml/g, was prepared. The solution of the polyphenylene ether was mixed with the given polyalkylene by Method III. The polymers were precipitated by addition of methanol, and were then processed to produce a dry powder.

2. Styrene Polymers 2.1. Vestyron® 114, a product of the firm HÜLS AKTIENGESELLSCHAFT, D-4370 Marl, FRG, was used as the styrene polymer. The characterizing parameters of this product may be found in the brochure "Plastics of Huels: Vestyron®" (in German), edition of September, 1983.

2.2. Vestyron® 616, a product of the firm Chemische Werke Huels AG, D-4370 Marl, FRG, was used as the styrene polymer. The characterizing parameters of this product may be found in the brochure "Plastics of Huels: Vestyron®" (in German), edition of September, 1979.

3. Polyalkenylene (The polyalkenylenes can be prepared according to Ivin, K. J., 1983, "Olefin Metathesis", pub. Academic Press; and according to the literature cited therein.)

3.1. Polyoctenylene: A polyoctenylene with a J-value of 120 ml/g and a trans-content of 80% was employed. Such a product is available commercially under the trade name "Vestenamer® 8012" (manufacturer: HÜLS AKTIENGESELLSCHAFT, D-4370 Marl 1, FRG). Additional characterizing parameters of this product may be found in the journal *Kautschuk, Gummi, Kunststoffe*, 1981, 185–190; and in Huels Pamphlet No. 2247, entitled "Vestenamer® 8012".

3.2 Polypentenylene: A polypentenylene with a J-value of 184 ml/g and a trans-content of 89% (determined by IR spectroscopy) was employed.

3.3 Polydodecenylene: A polydodecenylene with a J-value of 90 ml/g and a trans-content of 81% (by IR) was employed. Because the product is only slightly soluble in toluene, it was necessary to determine the J-value in decalin, at 135° C.

4. Copolymer of Styrene and Butadiene 4.1. A polymer mixture comprised of 60 parts by weight of a styrene-butadiene copolymer (85 wt.% styrene and 15 wt.% butadiene) and 40 parts by weight of an E-SBR rubber (weight ratio of styrene to butadiene=23.5:76.5) was employed. Both components were obtained in known fashion, by radical emulsion polymerization.

4.2. An S-B-S block copolymer based on styrene and butadiene was employed. Such a product is available commercially under the trade name "Cariflex® TR 102" (manufacturer: Shell Internationale Petroleum Co. Ltd.).

5. Additives 5.1. Didecyl phenyl phosphite.

5.2. Octadecyl 3-(3,5-di-tert-butyl-4-hydroxyphenyl)-propanoate.

5.3. An oxidized polyethylene wax with m.w. 1,500. Such a product may be prepared in known fashion by oxidation of polyethylene. It is also available commercially under the trade name "Vestowax® AO 1539" (manufacturer: HÜLS AKTIENGESELLSCHAFT, D-4370 Marl 1, FRG).

Preparation and Testing of the Polymer Mixtures

A "ZSK 30" double-screw kneader-mixer of the firm Werner and Pfleiderer, with conveying, kneading, and degassing zones, was employed to prepare the impact-resistant polymeric mixtures.

When Method I was employed (see supra), the components were mechanically mixed and were melted in the ZSK 30. In all cases a cylinder temperature of 250° C. and a screw rpm of 250 were employed. The resulting strings from the melt were granulated by standard procedures. The granules were dried at 110° C. to a moisture content of <0.05%.

When certain of the molding compositions were prepared according to Method III supra (Examples D, 12, and 14), the polyocetenylene and the other components were dissolved in an organic solution of the polyphenylene ether (solvent: 90 wt.% toluene and 10 wt.% methanol). The solution was then concentrated to 50 wt.%. The remaining solvent was then removed by flash vaporization. (Alternatively, a degassing extruder could have been employed.)

In Examples 18, I, and K (also according to Method III supra), the mixture of polyphenylene ether and polyocetenylene was precipitated out of the common solution by adding methanol, and was processed to yield a dry powder.

In carrying out Method III, first a preliminary molding composition was produced, comprised of polyphenylene ether (55 parts by weight) and high impact polystyrene (45 parts by weight), by evaporating a common solution of the polyphenylene ether and the high impact polystyrene (solvent: 90 wt.% toluene and 10 wt.% methanol). This precomposition was then mixed with the other components and was melted in a co-kneader at 240° C.

For determining the impact strength, $a_k'$ according to DIN 53 453, the granulate was processed to form standard specimens, using an injection molding machine with a cylinder temperature of 240°–260° C. and a temperature of 90° C.

The Vicat softening temperature according to DIN 53 460 was determined on pressed plates 4 mm thick which had been produced at 250° C.

| Ex. No. | Poly- phenylene ether | Polyphenylene ether | 2.1 | 2.2 | 3.1 | 3.2 | 3.3 | 4.1 | 4.2 | 5.1 | 5.2 | 5.3 | Method No. | Impact strength by DIN 53 453 (kJ/m$^2$) | Vicat softening temperature by DIN 53 460 A | B |
|---|---|---|---|---|---|---|---|---|---|---|---|---|---|---|---|---|
| A  | 1.2 | 90 | 10 |    |    |    |    |    |    | 0.5 |     |     | I   | 1.9  | 190 | 184 |
| 11 | 1.2 | 90 | 10 |    | 10 |    |    |    |    | 0.5 |     |     | I   | 7.5  | 189 | 180 |
| B  | 1.1 | 34 | 66 |    |    |    |    |    |    | 0.5 | 0.5 |     | I   | 2.2  | 128 | 126 |
| C  | 1.1 | 34 | 46 |    |    |    |    | 20 |    | 0.5 | 0.5 |     | I   | 6.7  | 126 | 118 |
| 12 | 1.1 | 34 | 46 | 5  |    |    |    | 15 |    | 0.5 | 0.5 |     | I   | 9.0  | 128 | 117 |
| D  | 1.3 | 60 |    |    | 40 |    |    |    |    |     |     |     | II  | 10.1 | 159 | 148 |
| 13 | 1.4 | 60 |    |    | 30 | 10 |    |    |    |     |     |     | II  | 17.0 | 163 | 149 |
| 14 | 1.4 | 60 |    |    | 30 |    | 10 |    |    |     |     |     | II  | 7.2  | 160 | 151 |
| E  | 1.5 | 34 |    | 66 |    |    |    |    |    | 0.5 | 0.5 |     | III | 10.1 | 133 | 127 |
| 15 | 1.5 | 34 |    | 56 | 10 |    |    |    |    | 0.5 | 0.5 |     | III | 11.4 | 134 | 125 |
| F  | 1.5 | 34 |    | 56 |    |    |    | 10 |    | 0.5 | 0.5 |     | III | 12.1 | 130 | 121 |
| 16 | 1.5 | 34 |    | 56 | 5  |    |    | 5  |    | 0.5 | 0.5 |     | III | 17.6 | 132 | 126 |
| G  | 1.5 | 34 |    | 66 |    |    |    |    |    | 0.5 | 0.5 | 1.5 | III | 12.2 | 129 | 119 |
| H  | 1.5 | 34 |    | 56 |    |    |    | 10 |    | 0.5 | 0.5 | 1.5 | III | 15.9 | 132 | 122 |
| 17 | 1.5 | 34 |    | 56 | 5  |    |    | 5  |    | 0.5 | 0.5 | 1.5 | III | 19.3 | 132 | 123 |
| 18 | 1.6 | 54 |    | 40 | 6  |    |    |    |    | 0.5 | 0.5 | 1.5 | III | 15.6 | 152 | 142 |
| I  | 1.6 | 54 |    | 40 |    | 6  |    |    |    | 0.5 | 0.5 | 1.5 | III | 13.8 | 153 | 143 |
| K  | 1.6 | 54 |    | 40 |    |    | 6  |    |    | 0.5 | 0.5 | 1.5 | III | 13.4 | 157 | 146 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A thermoplastic composition containing a polyphenylene ether, a styrene resin and a polyalkenylene, the said thermoplastic composition comprising:
   (A) a polyphenylene ether in an amount of 20–90 parts by weight;
   (B) a styrene resin in an amount of 5–70 parts by weight; and
   (C) a polyoctenylene in an amount of 2–20 parts by weight,
said polyoctenylene having been prepared by ring-opening, ring expanding or both ring opening and ring expanding polymerization of cyclooctene.

2. The thermoplastic composition of claim 1, which further contains, D, a styrene-butadiene copolymer in an amount of up to 20 parts by weight.

3. The thermoplastic composition of claim 1, which further contains as another additive, E, a flame retardant, a pigment, an oligomer, an antistatic agent, a stabilizer, a processability promoting agent or a reinforcing material.

4. The thermoplastic composition of claim 1, wherein the said polyphenylene ether A is a polymer of 2,6-dimethylphenol.

5. The thermoplastic composition of claim 1, wherein the said polyphenylene ether, A, has a viscosity number (according to DIN 53 728) of 40–65 ml/g.

6. The thermoplastic composition of claim 1, wherein the said styrene resin, B, is a styrene homopolymer having a molecular weight between 150,000 and 300,000.

7. The thermoplastic composition of claim 1, wherein the said styrene resin, B, is a high impact polystyrene.

8. The thermoplastic composition of claim 1, wherein the said polyoctenylene, C, has a viscosity number (according to DIN 53 728) of 50–350 ml/g, and 55–95% of its double bonds in the trans configuration.

9. The thermoplastic composition of claim 2, wherein the said copolymer based on styrene and butadiene, D, is a styrene-butadiene copolymer having a styrene content of 15–40 wt.%.

10. The thermoplastic composition of claim 2, wherein the said copolymer based on styrene and butadiene, D, is a S-B-S block copolymer of styrene and butadiene.

11. The thermoplastic composition of claim 3, wherein the said other additive, E, comprises up to 50 wt.% of reinforcing material and filling material or up to 15 wt.% of flame retardant, and the total amount of all of the said other additive is up to 5 wt.% of the total weight of the entire molding composition.

12. The thermoplastic composition of claim 2, wherein the amounts of the said components A, B, C, and D satisfy the following condition:

$$5 < [(a+b)/(c+d)] < 15,$$

where a, b, c, and d are the numbers of parts by weight of components A, B, C, and D in the composition, respectively.

13. The thermoplastic composition of claim 12, wherein the following conditions apply:
   $d > 0$;
   $0.5 < a/b < 2$; and
   $0.5 < c/d < 2$.

14. A method of manufacturing the thermoplastic composition of claim 1, wherein the said polyphenylene ether, the said styrene resin and the said polyoctenylene are melted and mixed together.

15. A method of manufacturing the thermoplastic composition of claim 2, wherein the said polyphenylene ether, the said styrene resin, the said polyoctenylene and the said copolymer based on styrene and butadiene are melted and mixed together.

16. A method of manufacturing the thermoplastic composition of claim 3, wherein the said polyphenylene ether, the said styrene resin, the said polyoctenylene, the said copolymer based on styrene and butadiene and the said other additive are melted and mixed together.

17. The method of claim 14, wherein a melting temperature of 230°–320° C. is used.

18. The method of claim 14, wherein a melting temperature of 240°–300° C. is used.

19. The method of claim 15, wherein a melting temperature of 230°–320° C. is used.

20. The method of claim 15, wherein a melting temperature of 240°–300° C. is used.

21. The method of claim 16, wherein a melting temperature of 230°–320° C. is used.

22. The method of claim 16, wherein a melting temperature of 240°–300° C. is used.

23. A method of manufacturing the thermoplastic composition of claim 1, wherein the components of the composition are dissolved in a suitable solvent, and the thermoplastic composition subsequently isolated by evaporating the said solvent or by precipitation out of the said solvent with a desolubilizing agent.

24. A method of manufacturing the thermoplastic composition of claim 1, wherein only a part of the components of the thermoplastic composition are dissolved in a suitable solvent and subsequently isolated by evaporating the said solvent or by precipitation out of the said solvent with a desolubilizing agent; and the resulting preliminary molding composition is then melted with the rest of the components of the thermoplastic composition and intermixed with the same.

* * * * *